(12) United States Patent
Schmitt et al.

(10) Patent No.: US 12,732,784 B2
(45) Date of Patent: Sep. 8, 2026

(54) METHOD AND SYSTEM FOR OPERATING A VEHICLE NAVIGATION SYSTEM

(71) Applicant: Bayerische Motoren Werke Aktiengesellschaft, Munich (DE)

(72) Inventors: Georg Schmitt, Munich (DE); Simon Springmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 18/923,824

(22) Filed: Oct. 23, 2024

(65) Prior Publication Data

US 2025/0175774 A1 May 29, 2025

(30) Foreign Application Priority Data

Nov. 23, 2023 (DE) ..................... 10 2023 132 717.8

(51) Int. Cl.
*H04W 4/44* (2018.01)
*G01C 21/36* (2006.01)
(Continued)

(52) U.S. Cl.
CPC .......... *H04W 4/44* (2018.02); *G01C 21/3697* (2013.01); *H04W 24/08* (2013.01); *H04W 64/00* (2013.01)

(58) Field of Classification Search
CPC ....... H04W 4/44; H04W 24/08; H04W 64/00; H04W 24/10; H04W 4/024; H04W 4/46;
(Continued)

(56) References Cited

U.S. PATENT DOCUMENTS 9,439,205 B1 * 9/2016 Lin .......................... H04L 67/12
2013/0321424 A1 12/2013 Pylappan et al.
(Continued)

FOREIGN PATENT DOCUMENTS

DE 10 2013 211 980 A1 1/2015
DE 10 2015 000 403 B3 4/2016
(Continued)

OTHER PUBLICATIONS

"Antenna Technologies for Automotive Applications" from www.mistra/solutions.com/ downloaded from The Wayback Machine Mar. 30, 2023 (Year: 2023).*
(Continued)

*Primary Examiner* — Kito R Robinson
*Assistant Examiner* — Tanya C Sienko
(74) *Attorney, Agent, or Firm* — Crowell & Moring LLP

(57) ABSTRACT

A method operates a vehicle navigation system, in which vehicles of a vehicle fleet are classified into vehicle groups according to an antenna characteristic with respect to a terrestrial wireless network. The vehicles of the vehicle fleet ascertain at various measurement locations the position of the measurement location and the signal strength and/or the signal quality of the wireless network. The vehicles each generate for each of the measurement locations, signal data, which signal data correspond to the position of the measurement location, the vehicle group of the transmitting vehicle, and the signal strength and/or the signal quality of the wireless network at the measurement location, and transmit the signal data to a backend. The backend processes the signal data in order to create a network coverage map for each of the vehicle groups, which is specific for the antenna characteristic of the respective vehicle group. A navigation system of at least one of the vehicles of the vehicle fleet carries out a navigation function on the basis of the network
(Continued)

coverage map assigned to the vehicle group of the at least one vehicle.

12 Claims, 2 Drawing Sheets

(51) Int. Cl.
*H04W 24/08* (2009.01)
*H04W 64/00* (2009.01)

(58) Field of Classification Search
CPC ............ G01C 21/3697; G01C 21/3453; G01C 21/3841
See application file for complete search history.

(56) References Cited

U.S. PATENT DOCUMENTS

| | | | | |
|---|---|---|---|---|
| 2014/0379252 | A1 | 12/2014 | Sorokin et al. | |
| 2017/0370742 | A1 | 12/2017 | Schumann et al. | |
| 2018/0132070 | A1 | 5/2018 | Henze et al. | |
| 2022/0345859 | A1 | 10/2022 | Falla Cepeda | |
| 2022/0397415 | A1* | 12/2022 | Neishaboori | G01C 21/3697 |
| 2024/0079795 | A1* | 3/2024 | Bae | H01Q 1/3208 |
| 2024/0098537 | A1* | 3/2024 | Shrivastava | H04W 4/021 |
| 2024/0205692 | A1* | 6/2024 | Buzzalino | H04W 16/18 |

FOREIGN PATENT DOCUMENTS

| | | | |
|---|---|---|---|
| DE | 10 2016 206 527 | A1 | 10/2017 |
| DE | 10 2016 221 986 | A1 | 5/2018 |
| DE | 10 2019 001 822 | A1 | 9/2019 |
| DE | 10 2023 001 775 | A1 | 8/2023 |
| EP | 2 965 301 | B1 | 5/2019 |

OTHER PUBLICATIONS

German-language Search Report issued in German Application No. 10 2023 132 717.8 dated Sep. 2, 2024 with partial English translation (12 pages).

* cited by examiner

METHOD AND SYSTEM FOR OPERATING A VEHICLE NAVIGATION SYSTEM

CROSS REFERENCE TO RELATED APPLICATION

This application claims priority under 35 U.S.C. § 119 from German Patent Application No. DE 10 2023 132 717.8, filed Nov. 23, 2023, the entire disclosure of which is herein expressly incorporated by reference.

BACKGROUND AND SUMMARY

The invention relates to a method for operating a vehicle navigation system. The invention furthermore relates to a system for operating a vehicle navigation system.

Methods are known from the prior art for generating network coverage maps, for example, network coverage maps of mobile wireless networks or other terrestrial wireless networks. Such network coverage maps are usually created by mobile wireless providers using simulations, for which purpose a universal antenna characteristic is typically assumed. However, methods are also known in which a network coverage map is created by evaluating mobile wireless data of a mobile terminal. The network coverage maps can be used, for example, to avoid or counteract disconnections.

DE 10 2016 206 527 A1 discloses a method in which multiple vehicles measure the local field strength of a wireless network in order to generate a dynamic field strength profile. This dynamic field strength profile is used to be able to identify local impairments of the wireless network, so that media content can be played back with improved acoustic quality.

A method is known from DE 10 2016 221 986 A1, in which the communication of a mobile terminal via a mobile communication system is adapted on the basis of earlier usage data. A communication restriction is ascertained on the basis of an expected position of the mobile terminal on a route covered multiple times by the mobile terminal and the communication of the mobile terminal is adapted accordingly Furthermore, a method is known from EP 2 965 301 B1, in which a network coverage map is ascertained by crowdsourcing. The network coverage map thus ascertained is used to determine a navigation route.

The object of the invention is to provide a method and a system for operating a vehicle navigation system which are improved in relation to the prior art.

This object is achieved by a method and by a system having the features of the independent claims. Advantageous refinements are specified in the dependent claims.

In the proposed method for operating a vehicle navigation system, vehicles of a vehicle fleet are classified into vehicle groups according to an antenna characteristic related to a terrestrial wireless network. The vehicles of the vehicle fleet ascertain the position of the measurement location and the signal strength and/or the signal quality of the wireless network at various measurement locations. The vehicles of the vehicle fleet generate signal data for the various measurement locations, which correspond to the position of the measurement location, the vehicle group of the transmitting vehicle, and the signal strength and/or the signal quality of the wireless network at the measurement location, and transmit the signal data to a backend. The backend processes the signal data in order to create a network coverage map for each of the vehicle groups which is specific for the antenna characteristic of the respective vehicle group. A navigation system of at least one of the vehicles of the vehicle fleet carries out a navigation function on the basis of the network coverage map assigned to the vehicle group of the at least one vehicle.

The vehicles can ascertain the position of the respective measurement location in particular using a global satellite navigation system. The accuracy of the position determination can be increased further by the use of dead reckoning. The navigation function can consist, for example, of identifying so-called dead zones, i.e. areas having inadequate network coverage, so that they can be avoided by the at least one vehicle. This enables the occupant of the at least one vehicle, for example, to stream media data, make a telephone call, or carry out a video conference via a broadband Internet connection during the entire journey without interruption. A constant connection to the wireless network is sometimes safety-relevant for automatically or autonomously driving vehicles.

It has been recognized according to the invention that the quality of network coverage maps can be substantially improved if a vehicle-specific antenna characteristic is assumed instead of a universal antenna characteristic. In the proposed method, the vehicles of the vehicle fleet are therefore classified into the vehicle groups according to their antenna characteristic, so that vehicles having similar antenna characteristic are classified into the same vehicle group. The network coverage maps created with the aid of the proposed method are therefore each specific for the vehicles of one of the vehicle groups. This means that using the network coverage maps, for example, vehicle-specific dead zones can be ascertained, so that dead zones are not ascertained where a vehicle does have a sufficient connection to the wireless network due to its antenna characteristic, solely because another vehicle or a mobile terminal could perhaps no longer establish an adequate connection at this point. This represents an improvement in relation to the prior art since it is thus possible to create highly accurate network coverage maps and, for example, to ascertain driving routes having a high level of network coverage with greater precision. Furthermore, the number of switching processes between the terrestrial wireless network and a non-terrestrial network can be optimized, due to which the downtimes and times of double connection are reduced. This reduces the gross data rate.

In one embodiment, as the navigation function, the navigation system ascertains a driving route of the at least one vehicle such that a network coverage on the driving route is optimized, in particular maximized. In this document, an optimized network coverage on the driving route means in particular that as few restrictions as possible exist for the connection between the at least one vehicle and the wireless network on the ascertained driving route, for example, due to dead zones or other areas having restricted connectivity. The navigation function therefore consists, for example, of ascertaining a driving route for which there is a stable connection to the wireless network as continuously as possible. A stable connection to the wireless network along the driving route has the above-mentioned advantages. The driving route can lead from a starting location to a destination location of the at least one vehicle, which is defined, for example, by an occupant.

In a further embodiment, the navigation system ascertains as the navigation function a driving route of the at least one vehicle such that the signal strength and/or the signal quality of the wireless network on the driving route are above a predetermined limiting value. If the driving route is determined in such a way, the network coverage on the driving route is optimized in the meaning of this document. In other words, a connection quality between the at least one vehicle and the wireless network is considered good if the signal strength and/or signal quality of the wireless network are above a predetermined limiting value. A location has poor or even no network coverage if a connection having a good connection quality cannot be established between the at least one vehicle and the wireless network at the location. Alternatively or additionally to the signal strength and/or the signal quality, further parameters of the wireless network can be used in these and all other embodiments in order to characterize the connection quality. Examples of such further parameters are mentioned and described hereinafter in conjunction with further embodiments.

In a further embodiment, as the navigation function, the navigation system ascertains at least one point of interest along a driving route of the at least one vehicle, for which the signal strength and/or the signal quality of the wireless network are above a predetermined limiting value. Alternatively or additionally, as the navigation function, the navigation system can output a corresponding output to an occupant of the at least one vehicle when the signal strength and/or the signal quality of the wireless network are below the predetermined limiting value at a point of interest being driven to. Points of interest can in particular be parking areas, filling stations, or charging infrastructure, such as a charging column. For example, to be able to download media data for an upcoming journey, the at least one vehicle has to be parked at a location at which a connection to the wireless network having a good connection quality can be established. The navigation system therefore informs the occupant about points of interest having good connection quality, filters out points of interest having poor connection quality, and/or warns the occupant that a point of interest being driven to has no or only poor network coverage. Additionally thereto, the navigation system can inform the occupant about alternatives in the vicinity which have a better connection quality.

In a further embodiment, as the navigation function, the navigation system ascertains that a connection failure can occur on a driving route of the at least one vehicle if the signal strength and/or the signal quality of the wireless network along a driving route lying in front of the at least one vehicle are below a predetermined limiting value. The driving route is in particular a driving route lying ahead of the at least one vehicle, which was predicted, for example, on the basis of an earlier usage of the vehicle or on the basis of usage data of other vehicles of the vehicle fleet. In this embodiment, the navigation system ascertains whether connection failures can occur. An array of measures can then be taken on the basis of this information in order to avoid or counteract the connection failures, which are described hereinafter on the basis of further embodiments.

In a further embodiment, the navigation system outputs a corresponding warning or a corresponding notification to an occupant of the at least one vehicle when it has been ascertained that a connection failure can occur on a driving route of the at least one vehicle. In this embodiment, the navigation system warns the occupant about an upcoming dead zone. The occupant can then, for example, select a different route on the basis of this information, for example, in order to be able to continue a telephone call or manually preload media content, in order to be able to continue to consume the media content without interruption.

In a further embodiment, the navigation system ascertains the duration of the connection failure and outputs a message to an occupant of the vehicle which informs the occupant about the duration of the connection failure. Knowing the duration of the connection failure enables the occupant to make an informed decision about how he wishes to deal with the dead zone to be expected. For example, the occupant can interrupt a telephone call or a media consumption if the duration of the connection failure to be expected is only brief. In the event of a longer connection failure, for example, the occupant can select another driving route.

In a further embodiment, data, in particular media data, are preloaded from a processing unit remote from the at least one vehicle into the at least one vehicle when it has been ascertained that a connection failure can occur on a driving route of the at least one vehicle. In this embodiment, the data are preloaded, in particular the media data for a media playback in the at least one vehicle, when a dead zone is coming up. This enables, for example, an uninterrupted media playback during the journey.

In a further embodiment, as the navigation function, the navigation system carries out a handover of at least one vehicle function from the terrestrial wireless network to a satellite wireless network when a driving route section is coming up on which the signal strength and/or the signal quality of the terrestrial wireless network are below a predetermined limiting value. In this embodiment, a connection of the vehicle function is transferred from the terrestrial wireless network to the satellite wireless network in order to ensure uninterrupted connectivity. The use of the vehicle-specific network coverage maps has the additional advantage in this embodiment that a transfer to the satellite wireless network only takes place when the vehicle could no longer establish a connection via the terrestrial wireless network according to the existing network coverage maps. This in particular saves costs, since connections via satellite wireless networks are often very expensive. Since the transfer is planned and does not take place only upon a connection failure, the transfer can furthermore take place without interruption of the connectivity. The switching processes necessary for the transfer are furthermore reduced.

In a further embodiment, the vehicles of the vehicle fleet each additionally ascertain at the measurement locations the network technology of the wireless network, a data rate, and/or a number of disconnections and transmit these as part of the signal data to the backend. The above-mentioned parameters supply further information about the connection quality between the terrestrial wireless network and the vehicle. This additional information can be used, for example, to be able to predict connection failures even more reliably. Furthermore, the above-mentioned parameters can be used in the proposed method alternatively or additionally to the signal strength and/or the signal quality of the wireless network in order to characterize the connection quality between the at least one vehicle and the wireless network.

In a further embodiment, the vehicles of the vehicle fleet are classified into the vehicle groups on the basis of the antenna characteristic of the vehicle model of the respective vehicle to be classified. In particular, vehicle models having comparable antenna characteristic can each be classified into the same vehicle group. The antenna characteristic of a vehicle model can be, for example, measured on a representative vehicle or determined by a simulation.

The invention furthermore relates to a system for operating a vehicle navigation system. The system comprises a navigation system of at least one vehicle of a vehicle fleet and a backend. The vehicles of the vehicle fleet are classified into vehicle groups according to an antenna characteristic related to a terrestrial wireless network. The vehicles of the vehicle fleet are furthermore designed to ascertain at various measurement locations the position of the measurement location and the signal strength and/or the signal quality of the wireless network, to each generate signal data for each of the measurement locations, which correspond to the position of the measurement location, the vehicle group of the transmitting vehicle, and the signal strength and/or the signal quality of the wireless network at the measurement location, and to transmit the signal data to the backend. The backend is designed to process the signal data in order to generate a network coverage map for each of the vehicle groups, which is specific for the antenna characteristic of the respective vehicle group. The navigation system of the at least one vehicle is designed to carry out a navigation function on the basis of the network coverage map assigned to the vehicle group of the at least one vehicle.

The system has the same advantages as the claimed method. In particular, the system can be refined by the features of the dependent claims directed to the method. Furthermore, the above-described method can be refined by the features which are described in this document in conjunction with the system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
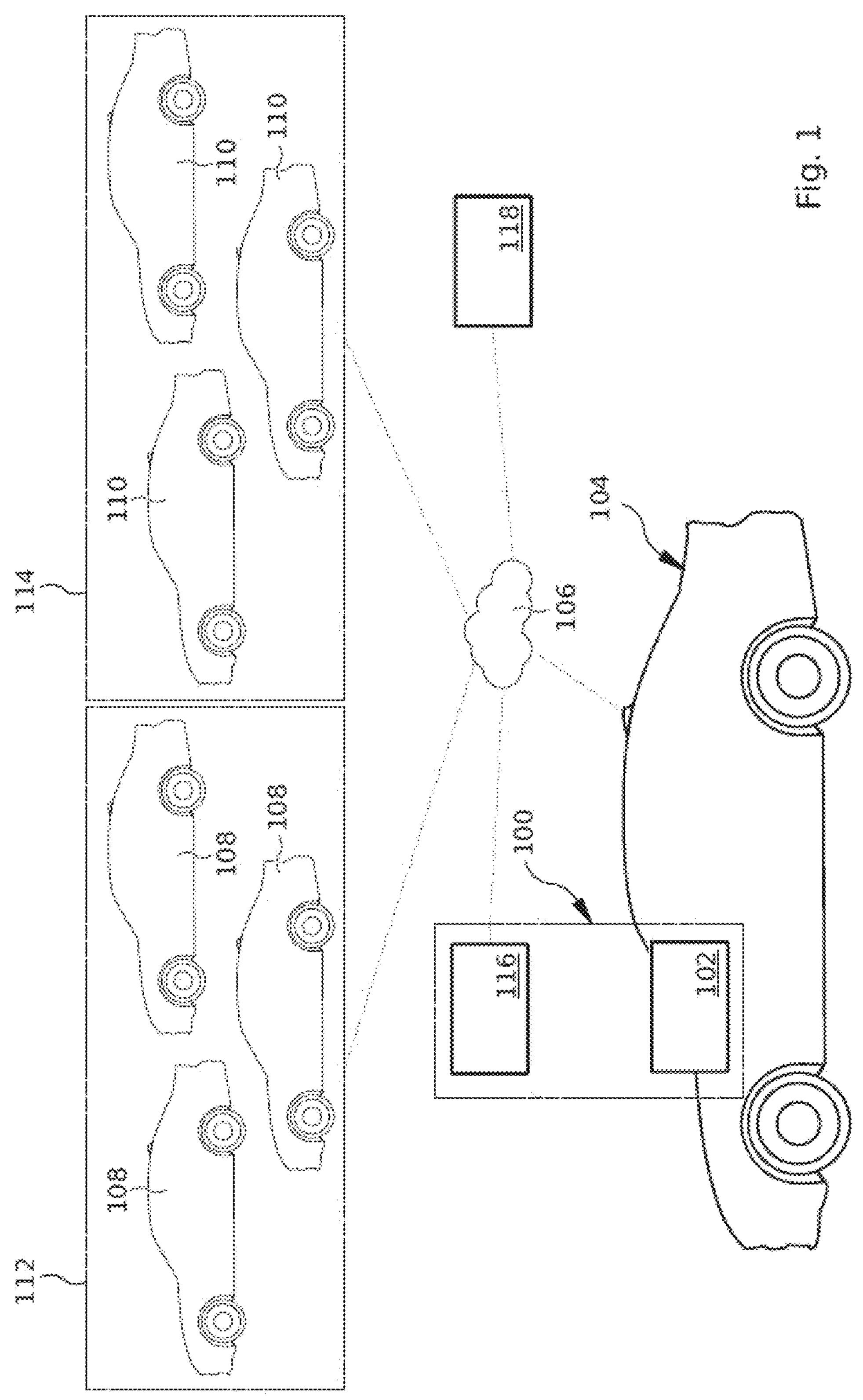
FIG. 1 is a schematic representation of a system for operating a vehicle navigation system.

FIG. 1 shows a schematic representation of a system 100 for operating a vehicle navigation system.

The system 100 is used to operate a navigation system 102 of at least one vehicle 104 on the basis of network coverage maps of a terrestrial wireless network 106. The network coverage maps are created by the system 100 itself with the aid of signal data, which are crowd sourced from vehicles 104, 108, 110 of a vehicle fleet. The vehicle fleet is classified into vehicle groups 112, 114, which each comprise vehicles 104, 108, 110 that have a comparable antenna characteristic with respect to the wireless network 106. It is therefore possible for the system 100 to create each of the network coverage maps specifically for the antenna characteristic of the vehicle groups 112, 114. The system 100 comprises, in addition to the navigation system 102 of the at least one vehicle 104, a backend 116 that processes the signal data in order to create the network coverage maps. The at least one vehicle 104 is also part of one of the vehicle groups 112, 114, although this is not shown in FIG. 1 for the sake of better clarity.

The vehicles 104, 108, 110 of the vehicle fleet are each designed to ascertain at various measurement locations at least the signal strength and/or the signal quality of the wireless network 106. The vehicles 104, 108, 110 of the vehicle fleet can furthermore be designed to ascertain further parameters which characterize a connection quality between the respective vehicle 104, 108, 110 and the wireless network 106. Such parameters can be, for example, the network technology of the wireless network 106, a data rate, and/or a number of disconnections at the respective measurement location. Additionally thereto, the vehicles 104, 108, 110 of the vehicle fleet are each designed to ascertain the geographic position of the measurement location, for example, with the aid of a global satellite navigation system. In order to increase the accuracy of the position determination, the vehicles 104, 108, 110 of the vehicle fleet can additionally thereto be designed to ascertain the geographic position of the measurement location using dead reckoning. At least the ascertained parameters which characterize the connection quality between the respective vehicle 104, 108, 110 and the wireless network 106, the geographic position of the measurement location, and the vehicle group 112, 114 of the transmitting vehicle 104, 108, 110 form the signal data. The vehicles 104, 108, 110 of the vehicle fleet are furthermore designed to transmit the signal data to the backend 116. The signal data can be transmitted in particular via the wireless network 106. If it should not be possible for one of the vehicles 104, 108, 110 of the vehicle fleet to transmit the signal data at the measurement time, the signal data can be stored by the vehicle and transmitted at a later time.

The backend 116 is designed to receive and process the signal data from the vehicles 104, 108, 110 of the fleet in order to create the network coverage maps. For this purpose, the backend 116 is connected, for example, via the wireless network 106 to the vehicles 104, 108, 110 of the fleet. This enables the backend 116 to update the network coverage maps nearly in real time. Alternatively or additionally, the signal data can also be transmitted at a later time than the measurement time to the backend 116, for example, when the transmitting vehicle 104, 108, 110 is parked and connected to a home network. The backend 116 combines the signal data, for example, with map data in order to create a separate specific network coverage map for each of the vehicle groups 112, 114. These vehicle-group specific network coverage maps are provided by the backend 116 for the navigation system 102 of the at least one vehicle 104.

The navigation system 102 of the at least one vehicle 104 is designed to carry out a navigation function on the basis of the network coverage map assigned to the vehicle group 112, 114 of the at least one vehicle 104. The navigation function can consist, for example, of ascertaining a driving route for the at least one vehicle 104, on which the signal strength and/or the signal quality of the wireless network 106 do not fall below a predetermined limiting value. It can therefore be ensured that no disconnections take place along the driving route thus ascertained. The navigation function can also consist of ascertaining whether disconnections are to be expected on the driving route of the at least one vehicle 104. If disconnections are to be expected, for example, media data for a media playback in the at least one vehicle 104 can be preloaded from a remote processing unit 118 into the vehicle in order to be able to ensure an interruption-free playback of the media. The navigation function is described in more detail hereinafter with reference to FIG. 2.

Figure 2:
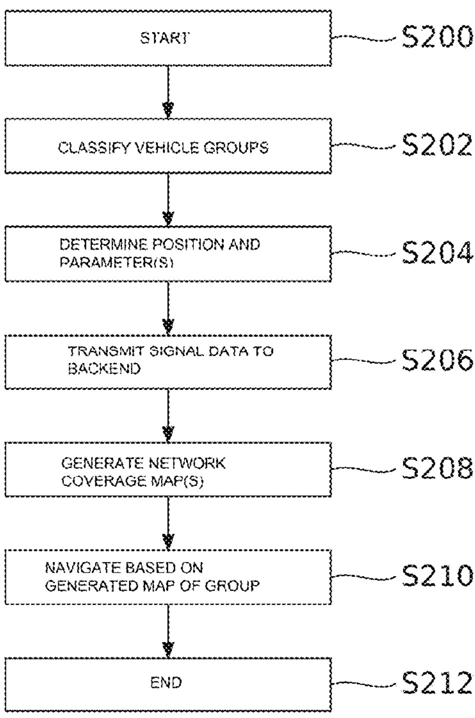
FIG. 2 is a flow chart of a method for operating a vehicle navigation system.

FIG. 2 shows a flow chart of a method for operating a vehicle navigation system.

The method is started in step S200. In step S202, the vehicles 104, 108, 110 of the vehicle fleet are classified into vehicle groups according to their antenna characteristic related to the wireless network 106. The classification takes place in such a way that vehicles 104, 108, 110 having similar antenna characteristic are classified into the same vehicle group 112, 114. In the meaning of this document, two vehicle antennas have a similar antenna characteristic if they have a similar spatial alignment and are arranged at comparable position on the vehicle 104, 108, 110. This is the case, for example, with vehicle antennas of vehicles 104, 108, 110 of the same type or same vehicle model.

In step S204, the vehicles 104, 108, 110 of the vehicle fleet ascertain at various measurement locations both the geographic position of the measurement location and at least one parameter which characterizes the connection quality of the connection between the vehicle 104, 108, 110 and the wireless network 106. These parameters can be, for example, the signal strength and/or the signal quality of the wireless network 106 at the measurement location. In step S206, the vehicles 104, 108, 110 of the vehicle fleet each generate the signal data which comprise at least the position of the measurement location, the vehicle group 112, 114 of the transmitting vehicle 104, 108, 110, and the value of the parameter characterizing the connection quality. Also in step S206, the vehicles 104, 108, 110 of the vehicle fleet transmit the signal data to the backend 116. Steps S204 and S206 are carried out continuously in order to be able to determine the connection quality at as many different measurement locations as possible and to always keep this information up-to-date.

In step S208, the backend 116 processes the signal data in order to generate a network coverage map for each of the vehicle groups. The network coverage maps are therefore specific for the antenna characteristic of the respective assigned vehicle group 112, 114. On the basis of a network coverage map assigned to one of the vehicle groups 112, 114, locations can be classified according to their connection quality between the vehicles 104, 108, 110 of the assigned vehicle group 112, 114 and the wireless network 106.

In step S210, the navigation system 102 of the at least one vehicle 104 carries out the navigation function on the basis of the network coverage map assigned to the vehicle group 112, 114 of the at least one vehicle 104. For example, the navigation system 102 ascertains whether a connection failure is to be expected on the driving route of the at least one vehicle 104. For this purpose, the navigation system 102 determines, for example, whether dead zones are located along the driving route, i.e. locations at which no or only a poor connection can be established between the at least one vehicle 104 and the wireless network 106. The driving route can be, for example, a driving route input by an occupant of the at least one vehicle 104 into the navigation system 102. Alternatively, the navigation system 102 can also be designed to predict, i.e. forecast, a future driving route of the at least one vehicle 104. This prediction can take place, for example, on the basis of a prior usage of the vehicle and/or on the basis of usage data which are crowd sourced like the signal data from the vehicles 104, 108, 110 of the vehicle fleet. On the basis of the predicted driving route, the navigation system 102 can, as the navigation function, warn the occupant, for example, of an imminent connection failure or in the event of an imminent connection failure initiate a handover of a vehicle function, such as speech or video telephony, to a satellite wireless network, for example.

In another example, the navigation system 102 initially ascertains on the basis of the network coverage map assigned to the vehicle group 112, 114 of the at least one vehicle 104 that a connection failure is to be expected on the driving route of the at least one vehicle 104. The navigation system 102 then ascertains an expected duration of the connection failure, for example, in consideration of the current speed of the vehicle or a speed of the vehicle predicted for the location of the connection failure. The navigation system 102 then informs the occupant about the expected duration of the connection failure by way of a corresponding output.

As the navigation function, the navigation system 102 can furthermore also determine points of interest which have a minimum connection quality that is predetermined or is determinable by the occupant, for example. Points of interest can be in particular parking areas or charging columns. This enables the occupant to park the at least one vehicle 104 at a location at which a connection to the wireless network 106 is possible and, for example, media data can be preloaded for a journey.

The method is then ended in step S212.

In the exemplary embodiment described on the basis of FIGS. 1 and 2, at least the navigation system 102 and the backend 116 form the system 100 for operating a vehicle navigation system. Further elements and features shown in FIGS. 1 and 2 and mentioned in the preceding description can be part of the system 100. Method steps described on the basis of the system 100 can also be part of the claimed method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

100 system
102 navigation system
104 vehicle
106 wireless network
108.110 vehicle
112, 114 vehicle group
116 backend
118 processing unit

What is claimed is:

1. A method for operating a vehicle navigation system, comprising:

a) classifying vehicles of a vehicle fleet into vehicle groups according to an antenna characteristic with respect to a terrestrial wireless network;

b) ascertaining, via the vehicles of the vehicle fleet, at each measurement location of various measurement locations, a position of the measurement location and a signal strength and/or a signal quality of the wireless network;

c) generating, via each of the vehicles of the vehicle fleet, signal data for each of the various measurement locations, which correspond to the position of the measurement location, the vehicle group of a transmitting vehicle, and the signal strength and/or the signal quality of the wireless network at the measurement location, and transmitting the signal data to a backend;

d) processing, via the backend, the signal data to generate a network coverage map for each of the vehicle groups, which is specific for the antenna characteristic of a respective vehicle group; and e) carrying out, via the navigation system of at least one of the vehicles of the vehicle fleet, a navigation function based on the network coverage map assigned to the vehicle group of the at least one vehicle.

2. The method according to claim 1, wherein as the navigation function, the navigation system ascertains a driving route of the at least one vehicle such that a network coverage on the driving route is optimized.

3. The method according to claim 1, wherein as the navigation function, the navigation system ascertains a driving route of the at least one vehicle such that the signal strength and/or the signal quality of the wireless network on the driving route are above a predetermined limiting value.

4. The method according to claim 1, wherein as the navigation function, the navigation system ascertains at least one point of interest along a driving route of the at least one vehicle, for which the signal strength and/or the signal quality of the wireless network are above a predetermined limiting value.

5. The method according to claim 1, wherein as the navigation function, the navigation system ascertains that a connection failure can occur on a driving route of the at least one vehicle when the signal strength and/or the signal quality of the wireless network are below a predetermined limiting value along the driving route lying ahead of the at least one vehicle.

6. The method according to claim 5, wherein the navigation system outputs a corresponding warning or a corresponding notification to an occupant of the at least one vehicle when it has been ascertained that a connection failure can occur on the driving route of the at least one vehicle.

7. The method according to claim 6, wherein the navigation system ascertains a duration of the connection failure and outputs a message to an occupant of the at least one vehicle which informs the occupant about the duration of the connection failure.

8. The method according to claim 6, wherein media data are preloaded, from a processing unit remote from the at least one vehicle, into the at least one vehicle when it has been ascertained that a connection failure can occur on the driving route of the at least one vehicle.

9. The method according to claim 1, wherein as the navigation function, the navigation system carries out a handover of at least one vehicle function from the terrestrial wireless network to a satellite wireless network when a driving route section is coming up on which the signal strength and/or the signal quality of the wireless network are below a predetermined limiting value.

10. The method according to claim 1, wherein the vehicles of the vehicle fleet each additionally ascertain at the measurement locations a type of network technology of the wireless network, a data rate, and/or a number of disconnections, and transmit these as part of the signal data to the backend.

11. The method according to claim 1, wherein the vehicles of the vehicle fleet are classified into the vehicle groups based on the antenna characteristic of a vehicle model of the respective vehicle to be classified.

12. A system for operating a vehicle navigation system, comprising:

a navigation system of at least one vehicle of a vehicle fleet; and a backend, wherein vehicles of the vehicle fleet are classified into vehicle groups according to an antenna characteristic with respect to a terrestrial wireless network, and the vehicles of the vehicle fleet are configured to:

ascertain, at each measurement location of various measurement locations, a position of the measurement location and a signal strength and/or a signal quality of the wireless network, generate signal data for each of the various measurement locations, which correspond to the position of the measurement location, a vehicle group of a transmitting vehicle, and the signal strength and/or the signal quality of the wireless network at the measurement location, and transmit the signal data to the backend;

wherein the backend is configured to process the signal data in order to create a network coverage map for each of the vehicle groups, which is specific for the antenna characteristic of the respective vehicle group; and wherein the navigation system of the at least one vehicle is configured to carry out a navigation function based on the network coverage map assigned to the vehicle group of the at least one vehicle.

* * * * *